Patented Mar. 21, 1944

2,344,889

UNITED STATES PATENT OFFICE 2,344,889

PROCESS OF ISOMERIZING PARAFFINS

Charles S. Lynch, Fanwood, and Jeffrey H. Bartlett, Westfield, N. J., assignors to Standard Oil Development Company, a corporation of Delaware No Drawing. Application November 22, 1940, Serial No. 366,708

11 Claims. (Cl. 260—683.5)

The present invention relates to a novel process for isomerizing normal hydrocarbons, in particular the straight chain paraffins, to produce branched chain hydrocarbons, in particular the isoparaffins.

Numerous processes have been proposed for converting normal paraffins into isoparaffins. Each of these processes utilizes at least one Friedel-Crafts type catalyst such as, for example, aluminum chloride, aluminum bromide, zinc chloride and the like. Also, to these Friedel-Crafts type catalysts there is added a promoter such as water, hydrogen chloride or hydrogen bromide. More recently it has been discovered that in addition to the promoter it has been found to be advantageous to carry out these reactions in the presence of considerable quantities of elemental or free hydrogen. So far as known, however, up to the present time no particularly effective catalyst has been found for converting normal paraffins into their corresponding isomeric forms in an efficient manner except the Friedel-Crafts type catalysts.

It has now been discovered that the isomerization of normal or straight chain paraffins to iso or branched chain paraffins may be efficiently carried out by employing a novel isomerization catalyst. It has been discovered that halo sulfonic acids when promoted with free hydrogen with or without boron trihalides serve to catalyze the isomerization of normal paraffins to isoparaffins.

It is an object of the present invention to carry out a process of isomerizing normal paraffins to isoparaffins in the presence of at least one halo sulfonic acid, free or elemental hydrogen and, advantageously, in some cases also in the presence of boron trihalide. It is a further object of the invention to carry out such a process in the presence of a liquid catalyst and at the same time increasing the desired catalytic effect of this novel catalyst by employing elemental or free hydrogen or some other suitable substance such as methane, ethane, propane, or mixtures of free hydrogen containing one or more of these hydrocarbons, and the like.

As examples of the materials which may be employed as catalysts there may be mentioned chlorsulfonic acid, fluorsulfonic acid and bromsulfonic acid. The catalyst mass may be composed of one of these materials or a mixture of two or more of them. Likewise, the boron trihalide promoter may be either boron trichloride or boron trifluoride, or a mixture of these two halides may be employed as the promoter. The exact chemical composition of the catalyst is not definitely known at present. When employing boron trihalides the catalyst may be considered as simply a mixture or solution of halo sulfonic acid containing dissolved or admixed boron trihalide. On the other hand, it is quite possible that some chemical reaction occurs between the boron trihalide, such as for example boron trifluoride, and the halo sulfonic acid, such as for example fluorsulfonic acid. If such reaction does occur, it would appear that the ultimate catalyst composition would be the products, both additive and decomposition, of such a reaction. However, the actual composition of the catalytic mass may in fact simply be an admixture of boron fluoride with fluorsulfonic acid. Regardless of the actual mechanism and theory of the catalyst formation and its exact chemical composition, the invention may be practiced by employing the necessary amount of halo sulfonic acid, adding thereto the desired quantities of fresh feed stock to be isomerized and pressing into the closed reaction chamber a sufficient quantity of free hydrogen, say for example that quantity of free hydrogen sufficient to increase the gauge pressure of the autoclave by 200 lbs./sq. in. When employing a boron trihalide as an additional component of the catalyst, it is pressed into the reaction chamber to the extent of say an additional 100 lbs./sq. in. of pressure. While no doubt considerable quantities of the boron trifluoride will dissolve in the fluorsulfonic acid, undoubtedly substantial amounts of the boron trifluoride remain outside of this phase and perhaps tend to promote the isomerization reaction in other ways the specific nature of which is as yet unknown. In introducing the boron trifluoride to the reaction zone it is desirable, in order to accurately determine the amount of boron trifluoride introduced, to maintain the autoclave at the desired reaction temperature prior to and during the boron trifluoride addition. On the other hand, if it is desirable to create a considerable autogenous pressure it may be preferable to cool the autoclave containing the fresh feed and fluorsulfonic acid and at this low temperature introduce the desired quantity of boron trifluoride. It then becomes practical to simply raise the temperature of the autoclave to the isomerization temperature, to vigorously agitate the reaction mixture and the pressure developed will be sufficient to carry out the desired results.

The process of the present invention is useful for the isomerization of a large variety of feed stocks. Thus, for example, normal butane, normal pentane, normal hexane, normal heptane, normal octane and the higher straight chain paraffinic homologues, either individually or in admixture with one another, may be employed as feed stocks in the present process. Likewise, field butanes, straight run naphthas, particularly those of predominantly paraffinic nature, and also simple branched chain paraffins which may be isomerized to more highly branched chain paraffins, may be employed. In general, any normal paraffin containing at least four carbon atoms per molecule or any mixture of paraffins predominantly composed of normal paraffins containing at least four carbon atoms per molecule may be employed as satisfactory feed stocks for the present process. From the standpoint of efficiency of operation, however, it is desirable to minimize the presence of olefins and aromatics in the feed stock, although small amounts of these substances may be present in the feed stock without disrupting to any great extent the catalytic activity and the completion of the desired isomerization process.

A temperature range between about 40° F. and about 350° F. is generally employed. It is preferred, however, with the usual type of feed stocks, particularly those of the higher paraffinic series, to employ a temperature between about 75° F. and about 200° F. Within any of the particular temperature ranges, however, it is necessary to correlate not only the temperature with the character of the straight chain paraffin being isomerized but also this temperature condition and the reactants should be correlated with the time of contact of the hydrocarbons with the catalyst mass and with the pressure under which the reaction is maintained. In general, contact times between about ½ hour and about 24 hours are employed. The actual length of residence of the feed in the reaction chamber is as above stated, but it is correlated with the temperature employed, the catalyst concentration and the nature of the feed entering the reactor. Generally, the preferred time of contact lies between about 1 hour and about 10 hours.

The amount of halo sulfonic acid employed may range between about 3% and about 100% by volume, preferably between about 10% and about 50% by volume, measured as liquid and based on the amount of reactants present in the reactor at any one time.

When used, the amount of boron trihalide, for example boron trifluoride, may vary to some extent. The amount of boron trihalide introduced into the reactor may amount to that quantity indicated by an increase in pressure of between about 25 and about 500 lbs./sq. in. when the temperature of the reactor is maintained at between about 40° F. and about 350° F. It is in general, however, preferred to operate at a boron trihalide pressure of between about 75 and about 290 lbs./sq. in. Obviously, at the higher pressures and lower reaction temperatures larger amounts of boron trihalides will be dissolved in the halo sulfonic acids. Any subsequent introduction of hydrogen, methane, ethane and/or propane, should be carried out at pressures sufficiently low so that upon the introduction of the required amounts the final total pressure in the reactor will be below about 1500 lbs./sq. in. In general, however, this upper pressure limit need not be employed.

The amount of elemental hydrogen introduced may vary over a fairly wide range. However, under the specified reaction temperatures hydrogen may be pressed into the reactor to the extent of increasing the pressure therein from between about 50 and about 500 lbs./sq. in., preferably between about 100 and about 300 lbs./sq. in., under the other reaction conditions obtaining. If a desired final total pressure of about 1500 lbs./sq. in. is to be maintained and the temperature and the vapor pressure of the reactants at that temperature, together with the total boron trihalide pressure, do not attain that desired pressure, then further hydrogen pressure may be advantageously applied to attain this desired 1500 lbs./sq. in. pressure. In general, where the reaction is carried out at the higher temperatures and under the other more drastic reaction conditions, and particularly where the feed stock has a considerable tendency to crack under these reaction conditions, the introduction of these larger amounts of hydrogen has been found to be advantageous in suppressing the tendency of the feed stock to crack. It is then possible to predominantly direct the reaction toward an isomerizing process.

It has been found desirable to maintain the reaction in the liquid phase and to vigorously agitate the reaction mixture to secure adequate contact of the catalyst composition with the feed stock. The production of high yields of isoparaffins from normal paraffins appears to be favored by an intensive agitation of a liquid phase reaction mixture. Any suitable type of agitating device may be employed, such as for example a turbo mixer, jets of restricted internal diameter, mechanical stirrers, etc.

The unreacted reactants, promoters, hydrogen and heavier and lighter products of the reaction which may be separated from the desired isomeric product and from each other may be returned, either in whole or in part as desired, to the isomerization zone. The desired isomeric products of the reaction may be separated as a hydrocarbon layer from the acid catalyst layer in a settler. The hydrocarbon layer may then be neutralized with a suitable alkali, for example caustic soda, and distilled to separate the above-mentioned products. The desired final products find many uses among which may be mentioned: as one of the reactants in aliphatic alkylation reactions, as blending agents in the preparation of aviation gasolines, as feed stocks for catalytic dehydrogenation units, etc. The acid catalyst layer coming from the settler may be returned to the isomerization reaction.

A continuous as well as a batch type of operation may be carried out in practicing the present invention. In general, for obvious commercial reasons the continuous process is preferred. No special type of apparatus need be employed. The types of apparatus now customarily employed for carrying out the polymerization of olefins in the liquid phase, the aliphatic alkylation of isoparaffins with olefins in the liquid phase, and similar types of equipment may be employed. It has been shown that a circulating stream type of process in which only a small portion of that stream is removed from the sphere or zone of reaction at any one time has advantages over some of the other types of equipment. Such a process may be employed in practicing the present invention. A series of reactors, each equipped as described, may be used either in parallel or in series. In a series arrangement various stages of the reaction may be carried out in each reactor under conditions best suited for that particular stage, that is, as to rates of throughput, times of contact, temperatures, amount of catalyst, etc.

As illustrative of the correlation of reaction conditions for carrying out the process of the present invention, the following examples are given. It is not intended that the invention be construed as limited thereto since the examples are illustrative only.

Example 1

An autoclave was charged with 1300 cc. of fluosulfonic acid and to this there was added 1300 cc. of normal pentane. The agitated mixture was maintained at a temperature of about 80° F. while free hydrogen was pressed into the autoclave to a pressure of about 100 lbs./sq. in. gauge. Boron trifluoride was then introduced into the autoclave in such an amount as to give a final overall pressure of about 200 lbs./sq. in. gauge in the autoclave. The mixture was then agitated for a period of about 3 hours and the reaction mixture was allowed to settle at the end of this time. The hydrocarbon layer was withdrawn, neutralized with caustic and distilled. It was found that about 24% of the normal pentane had reacted and that of the portion which had reacted about 79% thereof was isomerized to isopentane. Traces of hydrocarbons having 4 or less carbon atoms per molecule and of hydrocarbons having 6 or more carbon atoms per molecule were noted as having been formed during the reaction. However, the amount of these by-products in no case amounted to more than 3% of the final product.

Under comparable conditions, except that the 100 lbs. pressure of free hydrogen was omitted and the autoclaved reaction mixture was carried out under about 100 lbs./sq. in. gauge of boron trifluoride, 16% by volume of normal pentane reacted, of which 44% was converted to isopentane. The formation of $C_4$ and lighter hydrocarbons amounted to about 5% of the final product; and of $C_6$ and heavier hydrocarbons, about 4% of the final product.

Example 2

Using the same reactants and under conditions comparable to those set forth in Example 1, wherein 100 lbs./sq. in. gauge of free hydrogen pressure was maintained but the use of boron trifluoride was omitted, 15% by volume of normal pentane reacted, of which 40% was converted to isopentane. The final product contained about the same percentages of decomposition products as where boron trifluoride was used to the exclusion of hydrogen.

In a run made in which only 125 cc. of fluorsulfonic acid was employed per 250 cc. of normal pentane, wherein the reaction time was 2 hours and the temperature was 85° F., but no hydrogen or boron trifluoride pressures were employed and no free hydrogen or boron trifluoride was present in the reaction zone, the final product indicated that about 34% of the normal pentane had reacted, of which only 29% formed isopentane. The final product contained only 10% of isopentane, whereas the $C_4$ and lighter hydrocarbons constituted 13% and the $C_6$ and heavier hydrocarbons constituted 11% of the final product.

Example 3

Another run was made in the same manner as that indicated in Example 1 and the same quantities of fluorsulfonic acid and normal pentane were employed. The amount of boron trifluoride introduced was the same as in Example 1. However, the amount of free hydrogen introduced was such as to give an increase of about 200 lbs./sq. in. instead of 100 lbs./sq. in. employed in Example 1. The reactor was maintained at a temperature of about 110° F. and the time of contact of the catalyst with the reactants was about 3 hours. A hydrocarbon layer was isolated and neutralized as described in Example 1. It was found that 44% by volume of normal pentane had reacted; that of this 44% which reacted 34% of the product constituted isopentane, so that of the 44% of normal pentane which had reacted 77% was isomerized to isopentane The percentage of $C_4$ and lighter hydrocarbons was about 6%, and of $C_6$ and heavier hydrocarbons, about 4%.

In another run, under comparable conditions except that no boron trifluoride was present and the temperature was maintained at about 125° F. instead of about 110° F., the yield of hydrocarbon product indicated that 78% by volume of normal pentane had reacted. The product contained 23% of isopentane so that of the 78% reacted 30% was isomerized to isopentane.

Example 4

In another run carried out under identical conditions to that set forth in Example 1, except that the time of contact was permitted to continue for 6 hours instead of 3 and the temperature of the reactor was maintained at 90° F. instead of 80° F., it was found that 58% of the normal pentane had reacted and that of this 58% which had reacted the final product contained 45%. In other words, 78% of the 58% which did react went to isopentane with a $C_4$ and lighter hydrocarbon production of around 8% and a $C_6$ and heavier hydrocarbon production of around 5% of the final product.

In an autoclave 125 cc. of fluorsulfonic acid was charged together with 250 cc. of normal pentane. The temperature was maintained between about 70° F. and 75° F. and after the boron trifluoride, and in some cases after the free hydrogen had been added the reaction was vigorously agitated for from 2 to 4½ hours. The following table discloses the results of five experiments conducted under these conditions:

| Run No. | Press in lbs./sq./in. | | Time of contact, hours | Per cent vol. n-pentane reacted | Per cent vol. iso-pentane formed | Per cent selectivity |
|---|---|---|---|---|---|---|
| | $BF_3$ | $H_2$ | | | | |
| 1 | 100 | 200 | 3 | 16 | 16 | 100 |
| 2 | 120 | | 3 | 63 | 20 | 32 |
| 3 | 253 | | 2 | 45 | 18 | 40 |
| 4 | 410 | | 2 | 59 | 19 | 32 |
| 5 | 245 | | 4.5 | 65 | 18 | 28 |

Example 5

An autoclave was charged with 1300 cc. of fluorsulfonic acid. To this was added 1300 cc. of normal butane. The agitated mixture was maintained at a temperature of about 150° F. and hydrogen was introduced into the autoclave until a pressure of about 100 lbs./sq. in. gauge was attained. Boron trifluoride was then introduced in such an amount as to give a final overall pressure of about 225 lbs./sq. in. gauge. After about two hours of intensive agitation, the reactant mixture was allowed to settle, the hydrocarbon layer was separated, neutralized with caustic soda and distilled. The final product contained 52.3% of isobutane and it was found that 61.4% of the normal butane subjected to the reaction had in fact reacted. This represents a selectivity of 85%. Only 2.1% of $C_3$ and lighter hydrocarbons was produced, and only 6.4% of $C_5$ and heavier hydrocarbons was obtained.

Under similar conditions, except that the temperature was maintained at 200° F., no free hydrogen was present in the reaction and only 100 lbs./sq. in. of boron trifluoride were employed, the product contained 36.3% of isobutane, only 50.9% of the original normal butane had reacted and 8.7% of the final product constituted $C_3$ and lighter hydrocarbons while 4.3% constituted $C_5$ and heavier hydrocarbons. The selectivity in this instance was about 71%.

Example 6

To an autoclave containing 1300 cc. of fluorsulfonic acid there was added 1625 cc. of a 90-160° F. cut of a light East Texas casinghead naphtha having a Reid vapor pressure of 11.7 and an octane number of 66.5 by the A. S. T. M. method. This mixture was intensively agitated while sufficient free hydrogen was added to the autoclave to increase the pressure by 200 lbs./sq. in. gauge. There was also added to the mixture sufficient boron trifluoride to increase the pressure 100 lbs./sq. in. gauge above that already induced by reason of the introduction of the free hydrogen. The mixture was intensively agitated for three hours while maintaining the temperature at about 110° F. The final product was separated, neutralized with caustic soda and distilled. The octane number of the final product by the A. S. T. M. method was 71, which represents an increase of 4.5, and the Reid vapor pressure had increased to 13.1. An analysis in percentage by volume of the naphtha feed stock as compared with the final product is as follows:

| Hydrocarbon fraction | Analysis percent by volume | |
|---|---|---|
| | Feed stock | Final product |
| $C_4$ | 0 | 1 |
| Iso-$C_5$ | 8 | 19 |
| n-$C_5$ | 50 | 38 |
| Iso-$C_6$ | 21 | 22 |
| n-$C_6$ | 19 | 16 |
| $C_7$ and heavier | 2 | 4 |

It is evident from an analysis that considerable isomerization occurred in the $C_5$ fraction and that the increase in A. S. T. M. octane number from 66.5 to 71 and the increase in Reid vapor pressure from 11.7 to 13.1 can only be accounted for by reason of the isomerizing effect of the catalyst employed.

Example 7

An autoclave was charged with 1300 cc. of fluorsulfonic acid and to this there was added 1300 cc. of normal pentane. The agitated mixture was maintained at a temperature of about 110° F. while free hydrogen was pressed into the autoclave to a pressure of about 200 lbs./sq. in. gauge. Boron trifluoride was then introduced into the autoclave in such an amount as to give a final overall pressure of about 305 lbs./sq. in. gauge in the autoclave. The mixture was then agitated for a period of about 2 hours and the reaction mixture was allowed to settle at the end of this time. The hydrocarbon layer was withdrawn, neutralized with caustic and distilled. It was found that about 47% of the normal pentane had reacted and that of the portion which had reacted about 85% was isomerized to isopentane. Traces of hydrocarbons having 4 or less carbon atoms per molecule and of hydrocarbons having 6 or more carbon atoms per molecule were noted as having been formed during the reaction. However, the amount of these by-products in no case amounted to more than 6% of the final product.

Example 8

An autoclave was charged with the same quantities of normal pentane and fluorsulfonic acid as stated in Example 7. The mixture was agitated at a temperature of about 125° F. while pressing in about 200 lbs./sq. in. gauge of free hydrogen. Boron trifluoride was then introduced in an amount sufficient to give a final overall pressure of about 350 lbs./sq. in. gauge in the autoclave. The mixture was agitated for 1 hour and the product was recovered as a hydrocarbon layer which was withdrawn, neutralized with caustic and distilled. It was found that about 71% of the normal pentane had reacted and that of the portion which had reacted about 68% was isomerized to isopentane. Hydrocarbons having 4 or less carbon atoms per molecule and hydrocarbons having 6 or more carbon atoms per molecule were contained in the final product to the extent of about 13% and about 10% respectively.

There are indications when employing the higher straight chain paraffins as feed stocks to the process of the invention that considerable cracking occurs when employing the heretofore mentioned reaction conditions. It is significant, however, that the decomposition products, particularly those having a lower molecular weight than the original feed stock, are branched chain in character. The following example is illustrative of this characteristic of the process. It was found that not only were appreciable quantities of isoparaffins having the same number of carbon atoms per molecule as the feed stock obtained but the degradation products or cracked products of the reaction having fewer number of carbon atoms per molecule than the feed stock were branched chain in character as well.

Example 9

A mixture of 250 cc. of normal heptane with 125 cc. of fluorsulfonic acid was charged to an autoclave maintained at a temperature of about 75° F. A quantity of boron trifluoride was added thereto sufficient to raise the pressure to about 100 lbs./sq. in., and to this there was added an additional 50 lbs./sq. in. of free hydrogen pressure. The reaction mixture was agitated for a period of about 4 hours, at the end of which time the hydrocarbon product was recovered and it was found that about 93% of the normal $C_7$ hydrocarbon had reacted and that the product obtained contained about 35% of $C_4$ and lower paraffins, about 30% of $C_5$, about 8% of $C_6$, about 12% of iso-$C_7$ and about 8% of $C_8$ and heavier paraffins. The $C_4$ fraction contained about 8% of propane and lighter, about 6% of normal butane and about 86% of isobutane. The $C_5$ fraction also contained a preponderating amount of branched chain paraffins.

In a similar run carried out under identical conditions to those described in Example 9 except that the hydrogen pressure amounted to 200 lbs./sq. in. and the time of contact was about 2 hours instead of 4, a product was obtained which showed that about 96% of normal $C_7$ paraffin had reacted. The product comprised about 37% of $C_4$ and lighter paraffinic hydrocarbons, about 16% of $C_5$ paraffin, about 18% of $C_6$ paraffin, about 14% of iso-$C_7$ paraffin and about 11% of $C_8$ and higher paraffinic hydrocarbons. Here again as in Example 9 the $C_4$ and $C_5$ fractions contained a preponderating amount of branched chain paraffins. In fact the $C_5$ fraction contained no normal pentane so far as the critical methods could determine.

Having now thus fully described and illustrated the nature of the invention, what is claimed as new and useful and desired to be secured by Letters Patent is:

1. A process which comprises reacting at least one straight chain paraffin containing at least 4 carbon atoms per molecule under isomerizing reaction conditions in contact with a catalyst comprising essentially a member selected from the group consisting of halosulfonic acid and halosulfonic acid with boron trihalide, the reaction being carried out in the presence of free hydrogen.

2. A process which comprises isomerizing at least one straight chain paraffin containing at least four carbon atoms per molecule at a temperature between about 40° F. and about 350° F. in contact with a catalyst comprising essentially fluorsulfonic acid modified with between about 25 and about 500 lbs./sq. in. of boron trifluoride pressure in the presence of between about 50 and about 1,000 lbs./sq. in. additional pressure of at least one substance selected from the group consisting of free hydrogen, methane, ethane and propane, and correlating the feed, temperature, catalyst composition, time of contact and pressure so as to effectuate a substantial conversion in the liquid phase of straight chain paraffins to branched chain paraffins.

3. A process as in claim 2 wherein the reaction is effected in the presence of hydrogen and wherein the pressure on the reaction mixture is substantially equally supplied by the hydrogen and the boron trifluoride.

4. A process which comprises isomerizing at least one straight chain paraffin containing at least 4 carbon atoms per molecule under isomerizing reaction conditions in contact with a catalyst comprising essentially fluorsulfonic acid, the reaction being carried out in the presence of free hydrogen.

5. A process which comprises reacting at least one straight chain paraffin containing at least 4 carbon atoms per molecule under isomerizing reaction conditions in the presence of a superatmospheric pressure of free hydrogen and in contact with a catalyst comprising essentially fluorsulfonic acid in association with boron trifluoride.

6. A process for the production of branched chain paraffin which comprises isomerizing in the liquid phase normal paraffin containing at least 4 carbon atoms per molecule at a temperature between about 75° F. and about 200° F. for between about 1 and about 10 hours with agitatation and in the liquid phase in contact with between about 10 and about 50 volume per cent based on the hydrocarbon in the reactor at any one time of fluorsulfonic acid under between about 75 and about 290 lbs./sq. in. boron trifluoride pressure, under between about 100 and about 300 lbs./sq. in. additional pressure of free hydrogen, and correlating the various reaction conditions to produce substantial amounts of branched chain paraffin.

7. A process as in claim 6 wherein the reaction is carried out continuously.

8. A process which comprises preparing a normal pentane-fluorsulfonic acid mixture in equal amounts by volume and, while vigorously agitating the mixture maintained at about 110° F., pressing in about 100 lbs./sq. in. boron trifluoride pressure and about 200 lbs./sq. in. free hydrogen pressure, maintaining said reaction conditions for about three hours, separating a hydrocarbon layer from the reacted mixture and recovering isopentane therefrom.

9. A process which comprises isomerizing normal butane in the presence of about 100% by volume of fluorsulfonic acid at a temperature of about 150° F. with a boron trifluoride pressure of about 125 lbs./sq. in. and a free hydrogen pressure of about 100 lbs./sq. in. additional pressure, vigorously agitating the reaction mixture for about two hours and recovering isobutane from the reacted mixture.

10. A process which comprises isomerizing normal pentane to isopentane in the presence of about 100% by volume of fluorsulfonic acid, about 200 lbs./sq. in. gauge of free hydrogen pressure and sufficient boron trifluoride to produce a final overall pressure in the reaction zone of about 350 lbs./sq. in. gauge at a temperature of about 125° F. with vigorous agitation for about 1 hour and recovering isopentane from the reacted mixture.

11. A process which comprises isomerizing an East Texas casinghead naphtha with about 80% by volume of fluorsulfinic acid, with a boron trifluoride pressure of about 100 lbs./sq. in. and a free hydrogen pressure of an additional 200 lbs./sq. in. for about three hours at about 110° F. and recovering the resultant naphtha from the reaction mixture.

CHARLES S. LYNCH.
JEFFREY H. BARTLETT.

CERTIFICATE OF CORRECTION.

Patent No. 2,344,889. March 21, 1944.

CHARLES S. LYNCH, ET AL.

It is hereby certified that error appears in the printed specification of the above numbered patent requiring correction as follows: Page 5, second column, line 51, for "fluorsulfinic" read --fluorsulfonic--; and that the said Letters Patent should be read with this correction therein that the same may conform to the record of the case in the Patent Office.

Signed and sealed this 9th day of May, A. D. 1944.

Leslie Frazer (Seal)  Acting Commissioner of Patents.